Patented Dec. 24, 1935

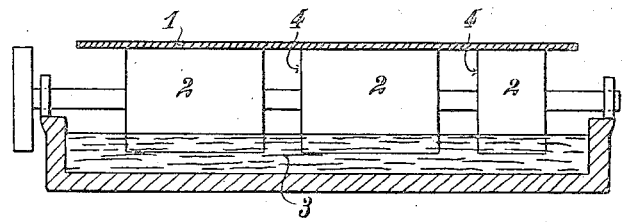
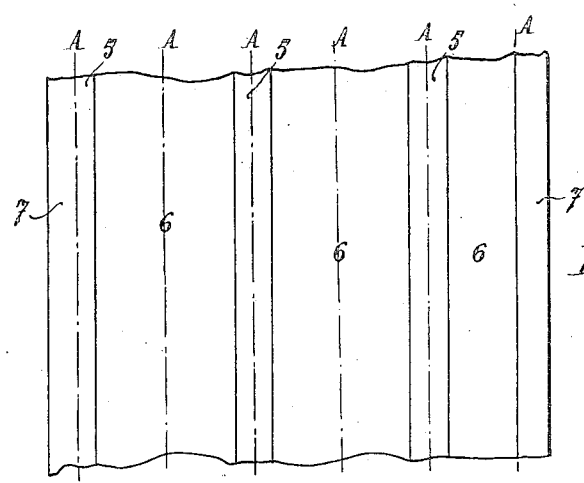
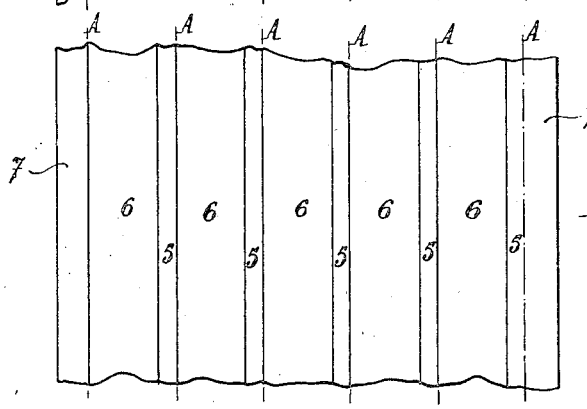
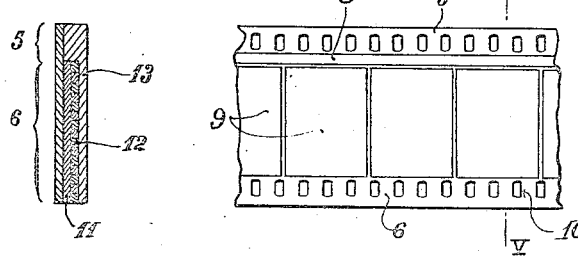

2,025,671

UNITED STATES PATENT OFFICE 2,025,671

CINEMATOGRAPHIC FILM IN NATURAL COLORS

Georges André Raguin, Lyon, France, assignor to "Société Lumière", Paris, France, a joint-stock company of France Application February 26, 1935, Serial No. 8,402
In France January 19, 1935

3 Claims. (Cl. 95—2)

This invention relates to cinematographic films in natural colors of the multi-color irregular screen type, able to receive a photographic sound record.

It is well known that the production of sounds (noises, music, speech) during the projection of a cinematographic film is generally performed either by means of phonographic disks operated in synchronism with the film, or through a photographic sound record provided along one of the edges of the film itself. The latter method is by far more widely used than the former one.

With multi-color screen films the marginal sound record is however unsatisfactory. The presence of the screen particles troubles the sound reproduction and causes an undesirable hum in the loud-speakers. Synchronized phonography disks are therefore usually employed with films of this type, which is a serious drawback since many projecting apparatus are not adapted to use such phonographic disks.

The multi-color irregular screen film according to the present invention avoids this disadvantage and can be used in the projecting apparatus of standard pattern provided with the ordinary photographic sound reproducing devices. In this film, the longitudinal portion adapted to form the sound track is void of any screen.

According to the invention such a film is preferably obtained by leaving unvarnished an appropriate longitudinal portion when applying to the film the bluing varnish adapted to retain the colored particles forming the irregular screen. When these particles are spread over the film they thus do not adhere to the latter along the unvarnished portion, and the manufacture may otherwise proceed in the usual way, the film being sensitized and cut.

The finished film according to the invention thus comprises a screened and sensitized portion adapted to receive the colored images (photographically copied from a master or original film) and an unscreened but sensitized portion adapted to receive the photographic sound record. It can thus be used in any ordinary projecting apparatus provided with sound reproducing devices.

The film may be manufactured either at its final standard width, or preferably at a larger width and then cut.

In the annexed drawing:—

Fig. 1 diagrammatically shows a gluing apparatus for the film.

Figs. 2 and 3 show two possible arrangements of the unvarnished portions.

Fig. 4 shows the finished film.

Fig. 5 is a section through the film of Fig. 4 taken along the line V—V.

In Fig. 1, the uncoated film 1 of large width passes on a varnishing roller 2 dipping into a varnish trough 3. Roller 2 is provided with grooves 4 which produce on the film unvarnished longitudinal portions.

The varnished film illustrated in Fig. 2 comprises three unvarnished portions 5. When the colored particles are spread over the film, they adhere to the film in the varnished portions 6 only. The particles are easily removed from the unvarnished portions, by blowing, for instance. The film is then sensitized in the usual manner and it is longitudinally cut along lines A—A. There is thus obtained five finished cinematographic films of standard width and two useless marginal portions 7. Each film comprises, as shown in Fig. 4, a screened portion 6 and a marginal portion 5 void of screen. Fig. 4 shows for the sake of clearness the sound track 8, the images 9 and the perforations 10. Fig. 5 is a section of Fig. 4 in which the thicknesses of the respective layers have been greatly exaggerated. It clearly shows the film proper 1, the varnish coating 11, the layer 12 of colored particles and the coating 13 of panchromatic sensitive emulsion. Of course the portion 5 void of screen could be limited to the sound track proper, but it is simpler to also provide no screen along the marginal portion itself where such a screen would be of no use. It would be also possible to provide no screen along the opposite margin, since the screen is only essential in the portion corresponding to the images 9.

It would be of course possible to avoid the loss of portions 7 with films of perfectly regular width having no defects along their edges.

In the film shown in Fig. 3, five unvarnished portions 5 are provided, but the film is so cut that it produces five cinematographic films of standard width as shown in Fig. 4.

It would be of course possible to directly produce a finished film of standard width by means of a roller arranged to varnish only the portion corresponding to portions 6 of Fig. 4.

I claim:—

1. A method for producing a film of the character described comprising the following steps: first of coating a transparent support with a gluing transparent varnish along a longitudinal portion corresponding to the succession of images of the finished film, but not along the longitudinal portion corresponding to the sound track; second, of spreading transparent multi-colored particles on said support; third, of removing the particles which do not adhere to said support; fourth, of coating the whole width of said support with a light-sensitive emulsion.

2. A method for producing films of the character described comprising the following steps: first of coating a transparent support several times wider than the finished films to be produced, with a gluing transparent varnish along a series of longitudinal portions corresponding to the respective successions of images of several finished films placed side by side, but not along the longitudinal portions corresponding to the sound tracks; second, of spreading transparent multi-colored particles on said support; third, of removing the particles which do not adhere to said support; fourth, of coating the whole width of said support with a light-sensitive emulsion; fifth, of longitudinally cutting said coated support to obtain a plurality of finished films of appropriate width wherein the portion adapted to bear the images is provided with an irregular multi-color screen, while the portion adapted to form the sound track is void of any screen.

3. A method for producing a sensitive film of the multi-color type for use in the production of sound record cinematographic films in natural colors, which comprises applying to the film transparent multi-colored particles along a strip narrower in width than the film and which is to receive the succession of images of the finished film; and then coating the film over the particles and over the full film width with a light-sensitive emulsion; the marginal portion of the film which is free of colored particles serving as a sound track.

GEORGES ANDRÉ RAGUIN.